Oct. 28, 1969  A. J. HIRST  3,475,015

FLUID SPRINGS

Filed Sept. 26, 1967  3 Sheets-Sheet 1

ARCHIE J. HIRST,
INVENTOR.

BY Stephen H. Frishauf
ATTORNEY

Oct. 28, 1969     A. J. HIRST     3,475,015

FLUID SPRINGS

Filed Sept. 26, 1967     3 Sheets-Sheet 2

United States Patent Office 3,475,015
Patented Oct. 28, 1969

3,475,015
FLUID SPRINGS
Archie John Hirst, Leicester, England, assignor to Metalastik Limited, Leicester, England, a British company
Filed Sept. 26, 1967, Ser. No. 670,609
Claims priority, application Great Britain, Oct. 13, 1966, 45,753/66
Int. Cl. B60g *11/30;* F16f *9/04, 9/36*
U.S. Cl. 267—65                                10 Claims

ABSTRACT OF THE DISCLOSURE

A fluid spring comprising a loose fitting piston and cylinder interconnected by a rolling diaphragm has a toric ring held in compression and rolling engagement in the bight of the diaphragm between the piston and cylinder walls. The toric ring acts transversely to locate the piston and cylinder relative to one another and accordingly, the suspended part relative to the non-suspended part in use of the spring.

---

Figure 1:
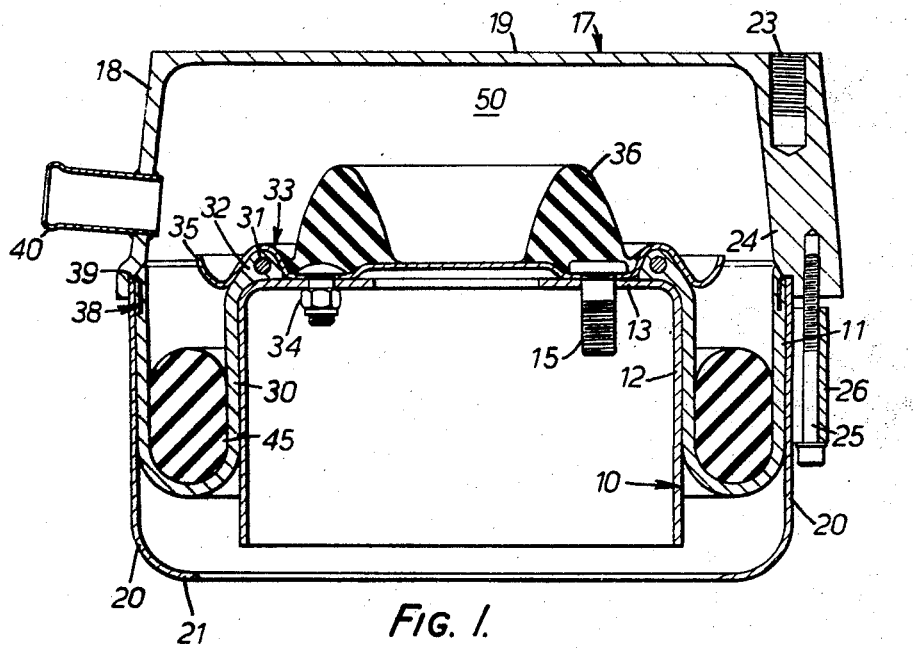

The invention concerns improvements relating to fluid springs, for example air springs, more particularly, though not exclusively for use in road vehicle suspension systems. The use of air springs in motor vehicle suspension systems offers a number of advantages among which may be mentioned the facility for levelling the vehicle and maintaining the vehicle body at a datum height above the ground regardless of the load on the vehicle.

Air springs of orthodox construction currently used in road vehicle suspensions are generally of two basic types namely the bellows type and the rolling diaphragm type. In the former type, a flexible wall or "bellows" encloses a mass of air between relatively movable mounting parts of the spring which air is subjected to compression under load applied to the spring, deflection of the spring being accompanied by deformation of the flexible wall. In the latter type, a loose fitting piston and cylinder assembly are interconnected by a flexible rolling diaphragm which seals the space between the piston and cylinder walls to seal a mass of air in the cylinder whereby the air is subjected to compression under load applied to the spring, deflection of the spring being accompanied by a rolling movement of the flexible diaphragm between the piston and cylinder walls. The main difficulty with these types of springs is that they act mainly to support the vertical load of the suspended part of the vehicle and do not provide any or any significant horizontal transverse or fore-and-aft restraint. Accordingly, unlike leaf spring suspensions, additional means are necessary to locate the vehicle wheels transversely and longitudinally with respect to the vehicle. This is an objectionable complication and there is a considerable demand for a fluid spring which will act in the same way as a laminated spring in the sense that it will give vertical springing and also locate the wheels or wheel axles transversely and longitudinally without the use of additional restraining or guiding means.

Acordingly, the present invention, in its broadest aspect, provides a fluid spring comprising a loose fitting piston and cylinder assembly having a toric ring of rubber or the like elastomeric material (hereinafter referred to generally as "rubber") held in radial precompression between the piston and cylinder walls, and rolling means for example a rolling diaphragm interconnecting the piston and cylinder and engaging round the toric ring to locate the ring, the ring and the rolling means rolling between the piston and cylinder walls upon deflection of the spring.

With this arrangement, the toric ring acts to provide radial restraint for horizontal loading on the spring while vertical loading is taken in the conventional manner by compression of fluid contained in the cylinder between the piston and the cylinder of the piston and cylinder assembly.

According to a feature of the present invention, the space between the piston and the cylinder walls may be sealed by the toric ring, the rolling means permitting the escape of fluid from between the normally engaging surfaces of the toric ring and the rolling means.

By adopting this feature, it may be ensured that the pressure of fluid contained in the spring will act to maintain the toric ring properly located against the rolling means since if fluid penetrates between the normally engaging surfaces of the toric ring and the rolling means it may escape to the outside of the spring and not act to hold the toric ring displaced. Alternatively or in addition, according to a further feature of the present invention, the walls of the piston and cylinder between which the toric ring is engaged may diverge in the direction in which the rolling diaphragm penetrates between them. In this case the rolling means may take the form of a fluid-tight diaphragm.

With an arrangement according to the feature of this invention last defined, the toric ring always tends to return to its proper location in which the rolling diaphragm engages round the ring since in this position it is subjected to the least precompressive strain between the piston and cylinder walls and naturally reverse to such location as and when it can.

As well as having divergent piston and cylinder walls as just described to cause the toric ring to return to its proper location should it become displaced for any reason, arrangement may also be provided for leaking fluid penetrating between the normally engaging surfaces of the toric ring and the rolling means so that the return of the ring to its proper location is assisted by the pressure of fluid in the spring.

If a fluid-tight rolling diaphragm is used and the toric ring is forced home into place between the piston and cylinder walls under considerable radial precompression so that the ring is tightly sealed against the diaphragm and properly located in the bight of the diaphragm with the diaphragm engaged round the ring, the ring cannot move out of its location relative to the diaphragm because otherwise a vacuum must form between the normally engaging surfaces of the toric ring and the diaphragm. It might happen however that the seal between the toric ring and the diaphragm would break if the spring were subjected to a high transverse shock loading when in use, allowing fluid to enter behind the ring, and for this reason means according to the alternative features of the invention as described, for ensuring that the ring will return to its proper location if it becomes displaced from it, may be necessary.

A specific embodiment of an air spring according to the invention is hereinafter described by way of example and also a front and a rear axle road vehicle suspension employing such springs.

Figure 2:
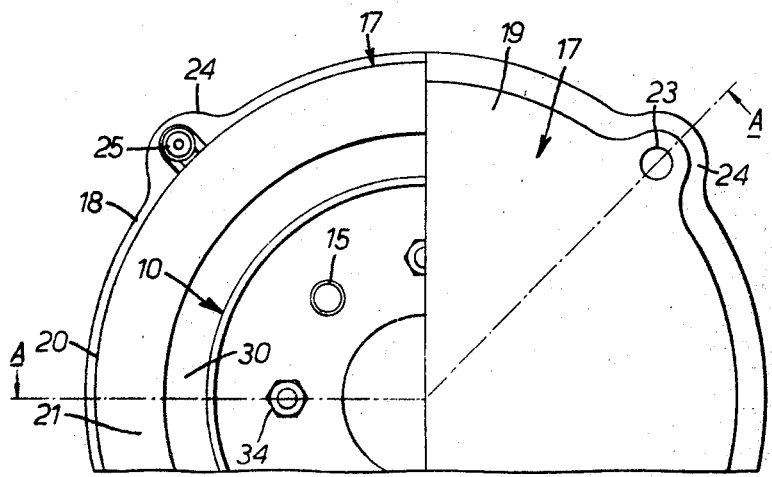
Figure 3:
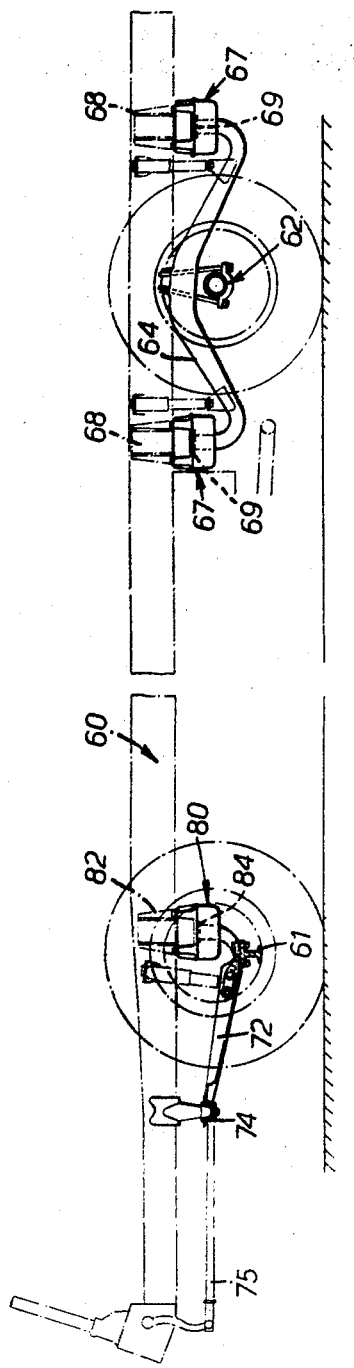
Figure 6:
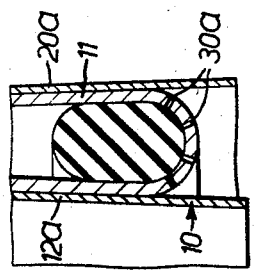
Figure 5:
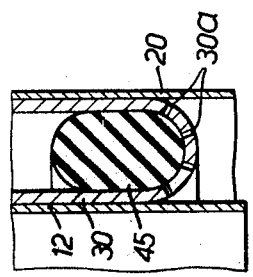
Figure 4:
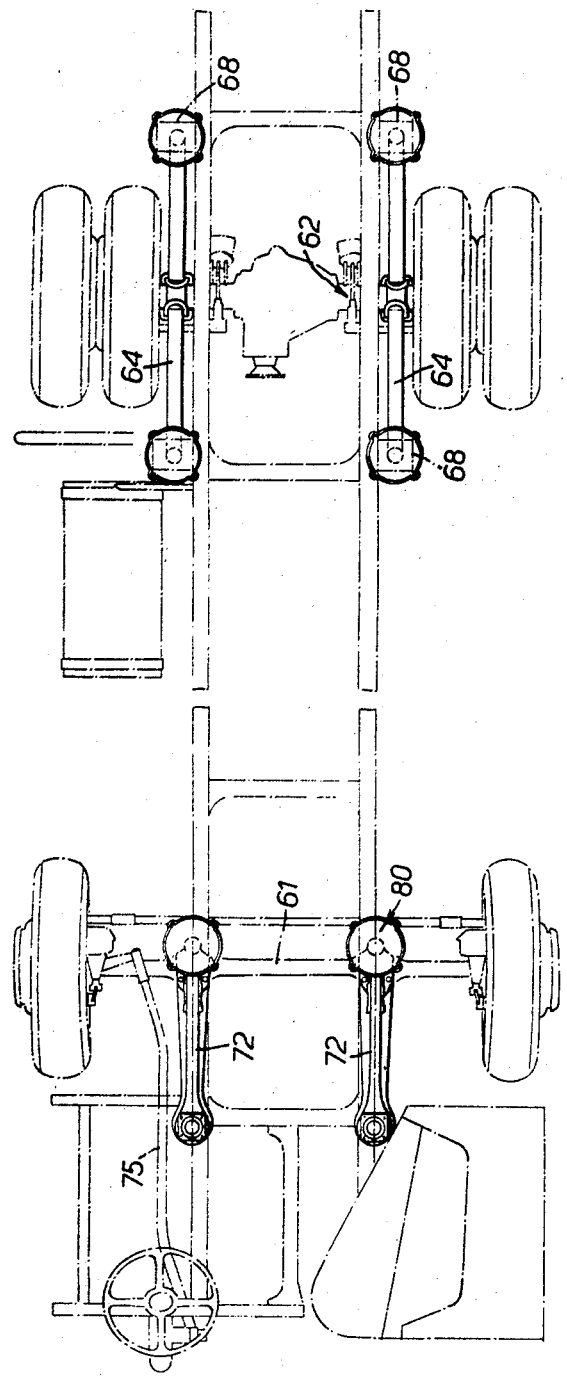

In the acompanying drawings:

FIG. 1 is a cross-sectional elevation of the air spring which is to be described, on line A—A of FIG. 2, FIG. 2 is a combined underneath and top plan view, on either side of the vertical centre line as drawn in the figure, of the spring shown in FIG. 1, FIG. 3 is a side elevation of a vehicle chassis incorporating the front and rear axle suspensions which are to be described, FIG. 4 is a top plan view of the chassis shown in FIG. 3, and FIGS. 5 and 6 are partial views corresponding with FIG. 1 and showing modifications.

Referring to FIGS. 1 and 2, a loose fitting piston and cylinder assembly is illustrated having a piston 10 and cylinder 11. The piston is of inverted cup form having a cylindrical side wall 12 and a top end wall 13 provided with four attachment studs 15 equally spaced on a common pitch circle.

The cylinder comprises a head portion 17 of inverted cup form, having a frusto-conical downwardly divergent side wall 18 and a top end wall 19, connected to a skirt portion 20 of generally cylindrical form but having a radially in turned flange 21 at its lower end which acts as a rebound stop, as later explained. The flange 21 may be omitted if desired.

The cylinder head portion has tapped holes 23 in lugs 24, formed externally of its side wall, for attachment studs, and is connected to the skirt portion by hexagonal-socket headed screws 25 passed upwardly through bores in lugs 26 formed integrally on the outside of the skirt portion and screwed into tapped holes in the lugs 24.

The piston 10 is a loose fit in the cylinder 11 in the sense that a considerable space is left between the cylindrical side wall 12 of the piston and the opposing cylindrical wall of the skirt portion 20. In the present example this space is sealed by a flexible rolling diaphragm 30 of rubber which may be reinforced with canvas or the like, interconnecting the piston 10 and the cylinder 11.

The inner peripheral edge of the diaphragm has a reinforcement ring 31 moulded into an attachment bead 32 clamped to the top end wall 13 of the piston by a clamping plate 33 bolted to the piston top end wall with bolts 34.

The plate 33 has a peripherally outer region formed as a rebound stop 35 hereinafter referred to again, and in its central region it carries an annular, molded-on, rubber bump stop 36 which engages the top end wall of the cylinder head 17 to limit the vertical deflection of the spring.

The outer peripheral edge of the diaphragm has a molded-in attachment ring 38 of L-section presenting a radially outwardly directed flange 39 which is clamped between the cylinder head and skirt portions thereby to anchor the diaphragm to the cylinder. The side wall 18 of the cylinder head is rebated to fit over the cylindrical wall of the skirt portion and the flange 39 is clamped between the edge of the cylindrical wall of the skirt portion and the rebated surface of the cylinder head.

Air-tight connections between the inner and outer peripheral edges of the diaphragm and the piston and the cylinder respectively is achieved in the manners of attachment described.

A connection nipple 40 for an air line is provided in the side wall 18 of the cylinder head.

A toric ring 45 of rubber i.e. a so-called O-ring is provided engaged in radial precompression between the piston side wall 12 and the cylindrical skirt portion 20 of the cylinder. In its free state, the ring 45, in the present example, is circular in cross-section but is deformed to the cross-sectional shape shown in FIG. 1 by the forces of radial precompression to which it is subjected in the assemblage. Instead of being circular in cross-section in its free state the ring 45 could be of some other cross-sectional shape, for example, oval, to give special properties. The ring 45 is shown located in its proper location in the bight of the rolling diaphragm so that the diaphragm engages round the ring and no space is left behind the ring between the ring and the bight of the diaphragm. Upon vertical deflection of the spring, the ring 45 and the diaphragm 30 roll together between the cylindrical wall of the skirt portion 20 and the cylindrical side wall 12 of the piston and the ring 45 is held in the bight of the diaphragm, with the diaphragm engaging around the ring, by the pressure of air in the cylinder space 50 above the diaphragm. Vertical deflection of the spring is limited by the bump stop 36 when the ring 45 has been rolled to the top of the cylindrical wall of the skirt portion 20 and on rebound by the stops 21 and 35 engaging respectively against the outside of the bight of the diaphragm and the top of the ring. For this purpose the stop 21 is curved to fit with the outside of the diaphragm bight.

In the horizontal direction relative displacement of the piston and the cylinder is resisted by the ring 45 which is deflected in compression and the spring accordingly exhibits horizontal stiffness as well as vertical stiffness, the former in all radial directions.

Due to the radial precompression of the ring 45, deflection of the spring in one horizontal direction, for example transversely to the right in FIG. 1, fails to break the seal between the ring 45 and the diaphragm at the opposite side of the ring, namely in the plane of the section of the ring on the left hand side in FIG. 1, unless a large radial deflection takes place. If such circumstances are liable to occur, such that air under pressure may penetrate behind the ring and the ring become displaced, provision may be made for leaking air through the diaphragm wall at spaced locations which are normally always covered over and sealed by the surface of the ring so as to prevent the scope of air from the space 50 unless the air first penetrates between the normally engaging surfaces of the ring and the diaphragm. Thus, as shown in FIG. 5, the diaphragm may have holes 30a.

In addition, or alternatively, the gap between the cylindrical side wall 12a of the piston and the cylindrical skirt portion 20a of the cylinder may be slightly divergent downwardly as shown in FIG. 6, that is to say in the direction in which the diaphragm 30 penetrates between the piston and the cylinder, whereby the ring 45 always tends to return to its position as shown in FIG. 6 relatively to the diaphragm in the event that it becomes displaced from that position.

A normal, moulded O-ring has a marked tendency to retain its originally moulded position so that when it is rolled there is, initialy, a resistance to the rolling over the first half revolution, whereafter the ring tends to spring back to its moulded position thereby exhibiting a negative stiffness characteristic over the second half of the revolution.

To avoid a possible difficulty that torque on the ring 45 arising from such a characteristic might give rise to slipping between the ring and the diaphragm, as opposed to the ring and diaphragm rolling with respect to one another, a "neutral" toric ring 45 may be employed. By a "neutral" toric ring is meant a ring which has no tendency to return to any particular position when it is rolled. Such a ring may be made by molding a straight rod and thereafter bending the rod round and joining its ends together to form the ring without imparting any permanent set to the ring.

Regardless of whether the toric ring is a neutral ring, damping work is done due to the deformation of the rubber of the ring involved in rolling the ring between the piston and the cylinder walls. This can give rise to a significant self-damping factor for the spring when subjected to vertical oscillations. Damping may also occur due to sliding friction between the ring and the diaphragm if some sliding as opposed to a pure rolling action between the ring and the diaphragm takes place during vertical deflection of the spring.

FIGS. 3 and 4 illustrate the application of air springs as described with reference to FIGS. 1 and 2 to a public service vehicle wheel suspension in which it is assumed that the rear wheels of the vehicle carry roughly twice the load of the front wheels and the front axle is required to rise and fall along an arcuate path to match the movement of the conventional steering drag link.

Referring to FIGS. 3 and 4, the chassis frame is indicated at 60, the front axle at 61 and the rear axle at 62. The rear axle is carried by a pair of longitudinally extending beams 64 replacing the conventional leaf springs, each beam being connected to the chassis frame at either end by an air spring 67 constructed as previously described. Thus the cylinders of the springs are mounted on brackets 68 secured to the chassis frame and the pistons are bolted to the two ends respectively of each beam, the beam ends being up-turned and provided with suitable attachment plates 69 secured to the studs 15 previously described.

With this arrangement, the beam-air spring combinations not only accommodate vertical deflections of the rear axle 62 but locate the axle longitudinally and transversely of the vehicles without the need to employ any auxiliary guiding or locating means for the axle, in exactly the same way as conventional leaf springs.

The suspension is also as easy to fit to the chassis as conventional leaf springs. Conventional shock absorbers may be provided connected between the beams 64 and the chassis frame.

The front axle 61 is carried by a pair of longitudinally extending trailing links 72 pivoted at their forward ends, as at 73, to the chassis frame, in the present example by rubber "Metacone" pivot mountings 74, so that the front axle is guided for rising and falling movement along an arcuate path to match the movement of the steering drag link, indicated at 75.

The rising movements of the two links are controlled each by an air spring 80 constructed as previously described. The cylinder is mounted on a bracket 82 attached to the chassis frame and the piston is connected to the trailing end of the link which is up-turned and provided with an attachment plate 84 secured to the studs 15 previously described.

The spring-link combinations entirely replace conventional laminated springs without additional guiding or locating means for the axle 61 and are as simply fitted to the chassis as a conventional suspension.

The air springs 67 and 80 would conveniently be connected to a source of compressed air through levelling valve gear operable automatically to maintain the vehicle at a given step height regardless of load for example, and to replenish any leakage of air from the springs. Similar arrangements may also provide for maintaining the vehicle in a predetermined attitude regardless of the distribution of the load.

Instead of using air as the fluid medium, the springs may use a fluid medium such as water or a suitable oil. The springs may operate with air over a body of liquid, the springs communicating with an air reservoir through suitable check valves.

Although the invention has been described in relation to springs having an effective area which remains constant, the invention is applicable to stroke variable area springs.

Springs according to the invention may be employed in the suspension system as set out in co-pending British application 431/66 and the springs may also be used in conjunction with dynamic self-levelling arrangements as described in that application.

I claim:
1. A fluid spring comprising:
   a cylinder;
   a piston movably mounted within said cylinder and forming a space between the walls of said cylinder and piston, the relative movement between said piston and cylinder being substantially in axial direction upon deflection of said spring;
   a resilient toric ring mounted in said space, said toric ring being maintained in radial compression between the walls of said cylinder and piston; and
   flexible rolling means interconnecting said piston and cylinder and engaging around said toric ring to locate said toric ring;
   said toric ring and said rolling means rolling between the piston and the cylinder walls upon deflection of the spring.

2. A fluid spring as claimed in claim 1 wherein the space between the piston and the cylinder walls is sealed by the toric ring, the rolling means including means for permitting the escape of fluid from between the normally engaging surfaces of the toric ring and the rolling means.

3. A fluid spring as claimed in claim 1 wherein the piston and cylinder walls between which the toric ring is located diverge in the direction in which the rolling means penetrates between them.

4. A fluid spring as claimed in claim 1 wherein at least one of the cylinder walls and the piston is provided with a flange to co-operate with the toric ring to act as a rebound stop.

5. A fluid spring as claimed in claim 1 wherein said rolling means comprises a rolling diaphragm.

6. A fluid spring as claimed in claim 5 wherein said cylinder includes a cylinder head portion and a skirt portion and wherein the outer peripheral edge of the rolling diaphragm is provided with a molded-in attachment ring adapted to be clamped between the cylinder head and skirt portions of the cylinder to anchor the diaphragm to the cylinder.

7. A fluid spring as claimed in claim 6 wherein said cylinder head portion has a side wall portion which is rebated to fit over the wall of said skirt portion of the cylinder, said attachment ring being clamped between the edge of the wall of the skirt portion and the rebated surface of the cylinder head.

8. A fluid spring as claimed in claim 1 wherein the toric ring is circular in cross-section when in its free, uncompressed state.

9. A fluid spring as claimed in claim 1 wherein the toric ring is a "neutral" toric ring.

10. A fluid spring as claimed in claim 1 wherein at least one of the piston and the cylinder is provided with a bump stop to limit the travel of said piston with respect to said cylinder.

References Cited

UNITED STATES PATENTS

| 2,901,240 | 8/1959 | Fikse | 267—65 X |
| 2,905,459 | 9/1959 | Fikse | 267—65 X |
| 2,956,797 | 10/1960 | Polhemus | 267—65 |
| 3,000,625 | 9/1961 | Polhemus | 267—65 |

A HARRY LEVY, Primary Examiner

U.S. Cl. X.R.

180—71; 280—124